United States Patent
Yonezawa et al.

(10) Patent No.: US 8,877,275 B2
(45) Date of Patent: Nov. 4, 2014

(54) PROANTHOCYANIDIN-RICH PLANT EXTRACT AND METHOD FOR PREPARING SAME

(75) Inventors: Daisaku Yonezawa, Osaka (JP); Naofumi Yoshida, Osaka (JP)

(73) Assignee: Suntory Holdings Limited, Osaka-shi, Osaka (JP)

(*) Notice: Subject to any disclaimer, the term of this patent is extended or adjusted under 35 U.S.C. 154(b) by 0 days.

(21) Appl. No.: 14/005,845

(22) PCT Filed: Mar. 30, 2012

(86) PCT No.: PCT/JP2012/058559
§ 371 (c)(1),
(2), (4) Date: Sep. 18, 2013

(87) PCT Pub. No.: WO2012/133758
PCT Pub. Date: Oct. 4, 2012

(65) Prior Publication Data
US 2014/0004239 A1    Jan. 2, 2014

(30) Foreign Application Priority Data
Mar. 31, 2011    (JP) .................. 2011-079690

(51) Int. Cl.
*C12C 3/08*    (2006.01)
*A23L 1/221*    (2006.01)
*A23L 1/222*    (2006.01)
*C12C 5/02*    (2006.01)
*A23L 2/56*    (2006.01)
*C12C 12/04*    (2006.01)

(52) U.S. Cl.
CPC .................. *C12C 3/08* (2013.01); *A23L 1/2215* (2013.01); *A23L 1/222* (2013.01); *C12C 5/026* (2013.01); *A23L 2/56* (2013.01); *C12C 12/04* (2013.01)

USPC .......................... 426/429; 426/590; 426/600

(58) Field of Classification Search
USPC .......................... 426/429, 600, 590
See application file for complete search history.

(56) References Cited

U.S. PATENT DOCUMENTS
2009/0124818 A1* 5/2009 Takagaki et al. .............. 549/399

FOREIGN PATENT DOCUMENTS
JP    2006-296378 A    11/2006

OTHER PUBLICATIONS

English Translation of JP 2006-296378 published Nov. 2006.*
Jerumanis. J. Inst. Brew. Jul.-Aug. 1985, vol. 91, pp. 250-252.*
Delcour et al. J. Inst. Brew. Nov.-Dec. 1981. vol. 87. pp. 391-393.*
Delcour et al. J. Inst. Brew. Nov.-Dec. 1984. vol. 90. pp. 381-384.*
International Search Report mailed Jul. 10, 2012 issued in PCT Application No. PCT/JP2012/058559.
McMurrough, et al., "Semipreparative Chromatographic Procedure for the Isolation of Dimeric and Trimeric Proanthocyanidins from Barley", J. Agric. Food Chem., 1996, vol. 44, No. 7, pp. 1731-1735.

(Continued)

*Primary Examiner* — Anthony Weier
(74) *Attorney, Agent, or Firm* — Drinker Biddle & Reath LLP

(57) ABSTRACT

To provide an extract or other substance that can impart not only bitterness and aroma but also taste elements such as koku and robustness without increasing astringency or harshness, and to provide a beverage having superior koku and robustness. Increasing hop-derived polyphenols, particularly trimeric proanthocyanidin makes it possible to provide beverages with koku and robustness without increasing astringency or lingering aftertaste.

8 Claims, 1 Drawing Sheet

(56) References Cited

OTHER PUBLICATIONS

Beer-fu Inryo Shijo Kyu Kakudai, Hokkaido Shinbun, Morning Paper, Dec. 4, 2010, p. 11 (Japanese language).

Derdelinckx, et al., "Separation of malt and hop proanthocyanidins of Fractogel TSK HW 40 (S)", Journal of Chromatrography, 1984, vol. 285, No. 1, pp. 231-234.

Aron, et al., "A Discussion of Polyphenols in Beer Physical and Flavour Stability", J. Inst. Brew., 2010, vol. 116, No. 4, p. 369-380.

* cited by examiner

PROANTHOCYANIDIN-RICH PLANT EXTRACT AND METHOD FOR PREPARING SAME

CROSS REFERENCE TO RELATED APPLICATIONS

This application is the National Stage of International Application No. PCT/JP2012/058559, filed Mar. 30, 2012, and claims benefit of Japanese Application No. 2011-079690, filed on Mar. 31, 2011, all of which are herein incorporated by reference in their entirety.

TECHNICAL FIELD

The present invention relates to a plant extract, a tasting agent and a beverage that are rich in proanthocyanidin. More specifically, the present invention relates to a trimeric proanthocyanidin-rich plant extract, a tasting agent that is rich in trimeric proanthocyanidin and thus can impart koku and robustness, and a beverage having koku and robustness.

BACKGROUND ART

Recently, in the fields of beers, low-malt beers, and beer-flavored beverages such as alcohol-free beer-flavored beverages, customers' diversified preferences have created a need for a method for improving aroma.

Hops, which are used in preparation of beers and beer-flavored beverages, contain various substances such as those which give bitterness and flavor. Thus, there are disclosed processing methods by which hops are processed or matured to thereby improve the quality of bitterness or flavor, and methods for enriching flavor.

To be specific, the processing methods for improving the quality of bitterness that are disclosed are: a method by which water-soluble astringency components and low-molecular-weight bitterness components are extracted and removed from hops to thereby prepare a sparkling alcoholic beverage that has refined and crisp bitterness, is less astringent, and is easy to drink (Patent Document 1); and a method by which a sparkling alcoholic beverage having lasting mild bitterness is prepared by using hops that have been stored at a high temperature (Patent Document 2).

The methods for improving flavor that are disclosed are: a method for preparing an after-ripened hop, which comprises enriching hop aroma components (Patent Document 3); and a method by which fresh hops that have been frozen without being dried after being harvested are used to impart a fresh hop flavor (Patent Document 4).

Also disclosed are a new type of method for preparing an alcoholic beverage, comprising adding an apple wine and hop polyphenols or apple polyphenols to a low-alcohol beverage (Patent Document 5), and a method by which a beer with increased polyphenols is prepared by using a malt of six-rowed barley as a raw material (Patent Document 6).

CITATION LIST

Patent Documents

Patent Document 1: Japanese Unexamined Patent Application Publication No. 2009-77671
Patent Document 2: Japanese Unexamined Patent Application Publication No. 2008-212041
Patent Document 3: Japanese Unexamined Patent Application Publication No. 2007-89439
Patent Document 4: Japanese Unexamined Patent Application Publication No. 2004-81113
Patent Document 5: Japanese Unexamined Patent Application Publication No. 2005-204585
Patent Document 6: Japanese Unexamined Patent Application Publication No. 2003-245064

SUMMARY OF INVENTION

Technical Problem

Objects of the present invention are to provide an extract or other substance that can impart not only flavor and bitterness but also taste elements such as koku and robustness without increasing astringency or lingering aftertaste, and to provide a beverage having superior koku and robustness.

Solution to Problem

The present inventors have conducted extensive study to solve the above-mentioned problems, and as a result have found that hop-derived polyphenols provide beverages with increased koku and robustness. The inventors have also found that the use of the hop-derived polyphenols, specifically polymeric polyphenols, particularly trimeric proanthocyanidin makes it possible to provide beverages with koku and robustness without increasing astringency or lingering aftertaste. Thus, the inventors have completed the present invention.

More specifically, the present invention includes, but is not limited to the following:

(1) A plant extract comprising dimeric, trimeric and tetrameric proanthocyanidins, wherein the trimeric proanthocyanidin is contained in a proportion by weight of at least 1.2 times the sum of weights of the dimeric and tetrameric proanthocyanidins;

(2) The plant extract as set forth in (1), wherein the plant is a hop;

(3) The plant extract as set forth in (1) or (2), comprising the trimeric proanthocyanidin in a concentration of at least 20% by weight.

(4) A tasting agent comprising trimeric proanthocyanidin.

(5) The tasting agent as set forth in (4), comprising the trimeric proanthocyanidin in a proportion by weight of at least 1.2 times the sum of the weights of dimeric and tetrameric proanthocyanidins.

(6) The tasting agent as set forth in (4) or (5), comprising the trimeric proanthocyanidin in a concentration of at least 20% by weight.

(7) The tasting agent as set forth in any of (4) to (6), wherein the trimeric proanthocyanidin is derived from a hop.

(8) A beverage comprising monomeric, trimeric and dimeric proanthocyanidins, wherein a content of the trimeric proanthocyanidin is 0.2-7.4 mg/L, and wherein the sum of contents of the monomeric and dimeric proanthocyanidins is 1.0-11.0 mg/L.

(9) A beverage comprising monomeric, trimeric and dimeric proanthocyanidins, wherein a content of the trimeric proanthocyanidin is at least a fifth of the sum of contents of the monomeric and dimeric proanthocyanidins.

(10) The beverage as set forth in (8) or (9), wherein the beverage is a beer-flavored beverage.

(11) A method for preparing a plant extract comprising trimeric proanthocyanidin, the method comprising the steps of:
 (i) extracting polyphenols from a plant using water;
 (ii) passing the resulting extract through a gel filtration column;

(iii) passing aqueous alcohol solutions through the column at sequentially increasing concentrations between 0% and 100%, so that trimeric proanthocyanidin is eluted from the column; and (iv) recovering the eluted trimeric proanthocyanidin fraction;

(12) The method as set forth in (11), wherein the plant is a hop;

(13) The method as set forth in (11) or (12), wherein the alcohol is ethanol.

Advantageous Effects of Invention

The use of the trimeric proanthocyanidin-rich plant extract or tasting agent of the present invention makes it possible to, without increasing astringency or lingering aftertaste, impart koku and robustness to low-malt beers which are generally inferior to beers in koku and robustness, beer-flavored beverages which are classified as "liqueurs" in Japan, and low-alcohol or completely alcohol-free beverages. Further, beverages that are rich in trimeric proanthocyanidin and thus have koku and robustness can be provided.

DESCRIPTION OF EMBODIMENTS

Figure 1:
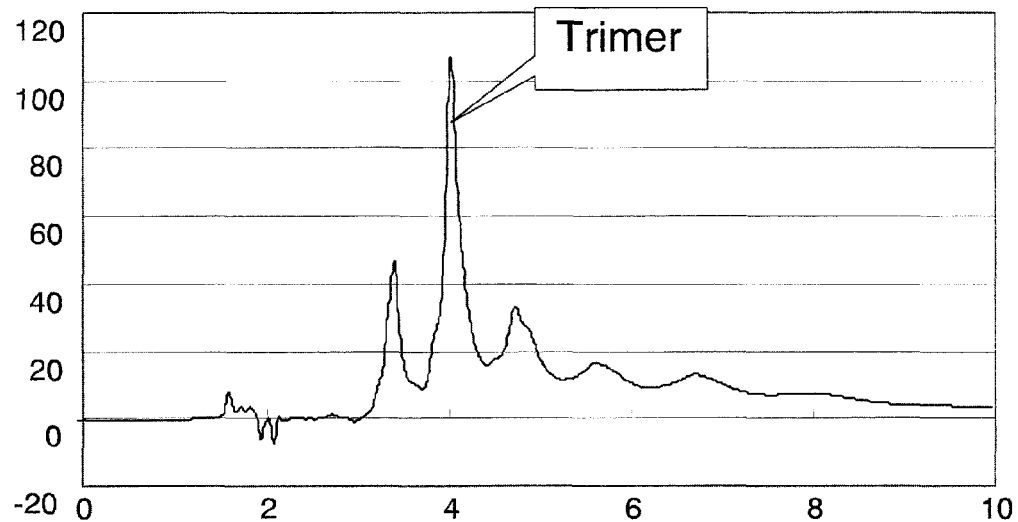
FIG. 1 is a plot showing the result obtained by fractionating total polyphenols derived from a hop extract by gel filtration chromatography and analyzing the desired fraction by HPLC.

The present invention provides a trimeric proanthocyanidin-rich plant extract, a tasting agent that is rich in trimeric proanthocyanidin and thus can impart koku and robustness, and a beverage that is rich in trimeric proanthocyanidin and thus has koku and robustness.

<Trimeric Proanthocyanidin-Rich Plant Extract, and Method for Preparing the Same>

The plant extract of the present invention comprises trimeric proanthocyanidin in a proportion by weight of at least 1.2 times, preferably at least 1.5 times, and more preferably at least 1.8 times the sum of the weights of dimeric and tetrameric proanthocyanidins.

Further, the inventive plant extract comprises trimeric proanthocyanidin in a concentration of at least 20% by weight, preferably at least 40% by weight, and more preferably 60% by weight.

The trimeric proanthocyanidin-rich plant extract of the present invention can be used as an additive for imparting koku and robustness.

As used herein, "koku" refers to a combination of the spread of taste (profoundness) and the change in taste with time (aftertaste), and "robustness" refers to the intensity of taste.

Proanthocyanidins are polyphenol compounds in which flavanols are condensed or polymerized, and trimeric proanthocyanidin has a structure represented by the following general formula.

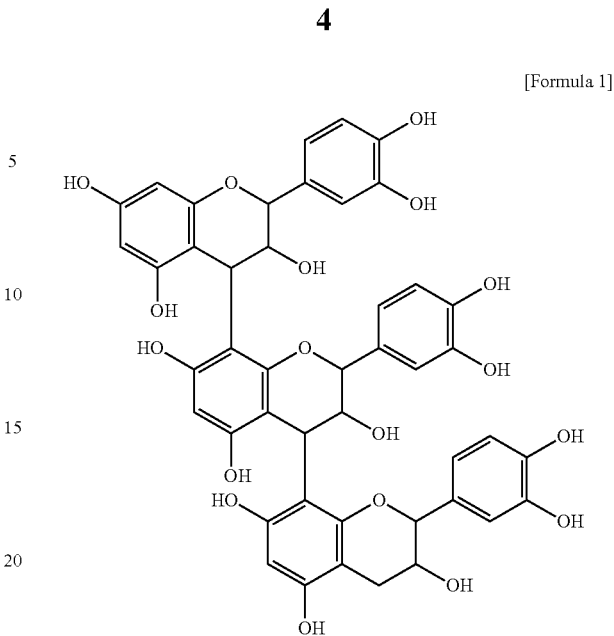

[Formula 1]

The plant extract of the present invention comprises at least procyanidin C1 as trimeric proanthocyanidin. The plant extract may also contain not only a dimer, a trimer and a tetramer, but also a monomer and a pentamer and higher oligomers.

The trimeric proanthocyanidin-rich plant extract of the present invention can typically be obtained by extracting polyphenols from hops, fractionating them by gel filtration chromatography, and recovering a trimeric proanthocyanidin-rich fraction.

The species of hops that are used are not limited, and examples include Saaz, Tradition, Perle, Cascade, and Nugget. Multiple species of hops may also be used in combination.

Any part of a hop may be used as long as the part contains trimeric proanthocyanidin. In the present invention, hops may be used in any form such as fresh, frozen, or dried form; examples of the form that can be used include: hop pellets composed of compressed hops; baled hops; residues generated upon preparation of an extract of bitterness components from hops typically using supercritical $CO_2$; and pulverized products thereof.

While any known procedure can be used as appropriate for extraction of polyphenols from hops, polyphenols can be extracted by mixing hops with an aqueous solvent, filtrating the mixture, and recovering the filtrate. Examples of the aqueous solvent used in polyphenol extraction include, but are not limited to, water, alcohols such as ethanol, or mixture thereof. The extraction conditions can be adjusted as appropriate; for example, extraction can be performed by mixing hop pellets with hot water at 95° C. or higher and stirring the mixture for about 10 to 30 minutes.

The resulting extract may be directly subjected to fractionation. Alternatively, a concentrate or freeze-dried powder of the extract may be dissolved into a solvent such as aqueous ethanol, and the resulting solution may be used for fractionation.

Various techniques such as known chromatographic ones can be used for fractionation to obtain a trimeric proanthocyanidin-rich extract. Examples of the technique that can be used include gel filtration chromatography, which will be described in Example 2. More specifically, the trimeric proanthocyanidin-rich extract can be obtained by the following procedure. First, freeze-dried powder of an extract from hops is dissolved into 10% ethanol and loaded onto a support for gel filtration chromatography (e.g., Sephadex® LH-20 (GE Healthcare Bioscience). Then, the support was washed with water in a volume of about 2-5 times that of the support charged. Further, aqueous ethanol solutions are passed through a column at sequentially increasing concentrations between 0% and 100%, and a fraction having the highest trimeric proanthocyanidin content is recovered. The concentrations of the solutions used for elution can be adjusted as appropriate; for example, passing through the column water, 35% aqueous ethanol, 70% aqueous ethanol, and 100% aqueous ethanol in sequence enables separation of proanthocyanidins by degree of polymerization. The trimeric proanthocyanidin contents in the eluted fractions can be measured typically using normal-phase high-performance liquid chromatography (HPLC) (refer to Japanese Unexamined Patent Application Publication No. 2006-38763). The trimeric proanthocyanidin content is at least 20% by weight, preferably at least 40% by weight, and more preferably 60% by weight. Molecular weight determination using LS/MS allows confirmation that the resulting component is the desired trimer.

The recovered fraction may be directly used as the trimeric proanthocyanidin-rich plant extract of the present invention or may be subjected to various treatments such as concentration, freeze-drying or spray drying before use.

<Tasting Agent>

The trimeric proanthocyanidin-rich plant extract of the present invention can be used as a tasting agent for imparting koku and robustness to a beverage.

The weight of trimeric proanthocyanidin in the tasting agent of this invention is at least 1.2 times, preferably at least 1.5 times, and more preferably at least 1.8 times the sum of the weights of dimeric and tetrameric proanthocyanidins.

The tasting agent of this invention comprises trimeric proanthocyanidin in a concentration of at least 20% by weight, preferably at least 40% by weight, and more preferably at least 60% by weight.

The tasting agent of this invention has a high trimeric proanthocyanidin content and thus, when incorporated in a beverage, can impart koku and robustness to it without increasing bitterness or harshness. This is due to the capabilities of this agent to relatively increase the trimeric proanthocyanidin concentration which most affects the taste, as compared with the concentrations of dimeric and tetrameric proanthocyanidins, and to impart koku and robustness without giving astringency or lingering aftertaste.

The type of beverage in which the inventive tasting agent is to be incorporated is not particularly limited, and examples include low-malt beers, beer-flavored beverages (including low-alcohol and alcohol-free beer-flavored beverages), and other alcohol-free beverages such as carbonated drinks, fruit juice drinks, sport drinks, and fortified beverages.

The tasting agent of this invention is incorporated in a beverage so as to give a concentration of $3.6 \times 10^{-4}$% by weight to $10.5 \times 10^{-4}$% by weight, preferably $5.2 \times 10^{-4}$% by weight to $8.9 \times 10^{-4}$% by weight, and more preferably $6.8 \times 10^{-4}$% by weight to $7.4 \times 10^{-4}$% by weight, based on the beverage.

When the tasting agent is incorporated in fermented beverages such as beers and low-malt beers, it may be added in any phase that precedes an after-fermentation step, but it is preferably added immediately before the after-fermentation step.

The tasting agent of this invention may contain any additives such as emulsifying agent, isotonizing agent, buffering agent, solubilizing agent, antiseptic agent, stabilizing agent, and antioxidant, as long as these additives do not impair the effects of the tasting agent.

The tasting agent of this invention can take any form such as liquid, powder, granule and tablet depending on the purpose of its use. In this process, any formulation ingredient may also be added to it, such as excipient, disintegrating agent, lubricating agent, binding agent, antioxidant, deflocculating agent, absorption enhancer, dissolution aid, stabilizing agent, solubilizing agent, taste masking agent, flavoring agent, and coloring agent.

<Beverage>

The beverage of this invention has superior koku and robustness.

In the beverage of this invention, the trimeric proanthocyanidin content is 0.2-7.4 mg/L, and the sum of the contents of monomeric and dimeric proanthocyanidins is 1.0-11.0 mg/L.

The trimeric proanthocyanidin content is 0.2-7.4 mg/L as mentioned above, preferably 1.0-6.4 mg/L, and more preferably 4.0-4.7 mg/L. In the case where the beverage of this invention is an alcohol-free beer-flavored beverage, the trimeric proanthocyanidin content is 0.2-7.4 mg/L as mentioned above, preferably 1.0-6.0 mg/L, and more preferably 2.7-5.0 mg/L.

The sum of the contents of monomeric and dimeric proanthocyanidins is 1.0-11.0 mg/L as mentioned above, preferably 5.0-8.0 mg/L, and more preferably 6.0-6.8 mg/L.

In the beverage of this invention, the trimeric proanthocyanidin content is at least a fifth, preferably at least a fourth, and more preferably at least a third of the sum of the contents of monomeric and dimeric proanthocyanidins. In the case where the beverage of this invention is an alcohol-free beer-flavored beverage, the trimeric proanthocyanidin content is at least a fifth, preferably at least a fourth, more preferably at least a third, and particularly preferably at least a half of the sum of the contents of monomeric and dimeric proanthocyanidins. Thus, increasing the relative proportion of a trimeric proanthocyanidin content in a beverage produces a beverage having superior koku and robustness.

Non-limiting examples of the beverage of this invention include low-malt beers, beer-flavored beverages (including low-alcohol and alcohol-free beer-flavored beverages), and other alcohol-free beverages such as carbonated drinks, fruit juice drinks, sport drinks, and fortified beverages.

The present invention will be described below in more detail with reference to Examples, but the technical scope of the invention is not limited to these examples.

EXAMPLES

Example 1

Extraction of Polyphenols from Hops

Twenty grams of hop pellets was subjected to extraction with 2 L of water under stirring at 97° C. for 20 minutes. The extract was filtrated, allowed to cool, and concentrated to 100 mL at 30° C. under reduced pressure, and the concentrate was freeze-dried into powder. The yield from hops was 28%.

Example 2

Fractionation of Polyphenols

A solution prepared by dissolving 1.25 g of the hop extract obtained above in 10 mL of 10% ethanol was passed through a column (5 cm diameter) charged with 450 mL of Sephadex LH-20 (swollen with 50% ethanol); thereafter, 500 mL of water, 500 mL of 35% ethanol, 1,000 mL of 70% ethanol, and 1,500 mL of 100% ethanol were sequentially passed through the column to thereby sequentially elute polyphenols by degree of polymerization. The last 250 mL of the eluate of 70% ethanol was concentrated to about 25 mL at 30° C. under reduced pressure, freeze-dried, and then analyzed by HPLC, whereby 0.022 g of a tasting agent was obtained in the form of powder. The yield from the hop extract was 1.8%. HPLC analysis of the resulting powder gave a chromatogram as shown in FIG. 1, where the peak observed at the elution time of 3.9 minutes shows the presence of trimerized polyphenol. The trimerized polyphenol had an area ratio of 51.4%. The same procedure was performed for each of the 250 to 500 mL fraction of elution with 70% ethanol, the 500 to 750 mL fraction of the same, and the 0 to 1500 mL fraction of elution with 100% ethanol, and the resulting products were used as monomeric, dimeric, and tetrameric and higher oligomeric polyphenol fractions, respectively.

(HPLC Conditions)

Analyzer: HEWLETT PACKARD SERIES 1100; column: Inert Sil (GL Sciences Inc., SIL 100A, 3 μm, 4.6×150 mm); flow rate: 1.0 mL/min; mobile phase: solution consisting of hexane, methanol, tetrahydrofuran, and formic acid in the ratio of 45:40:14:1 (this solution was used for isocratic elution); sample injection: 10 μL; detection: multiple wavelength detection at 200-300 nm Example 3

Sensory Evaluation

Figure 2:
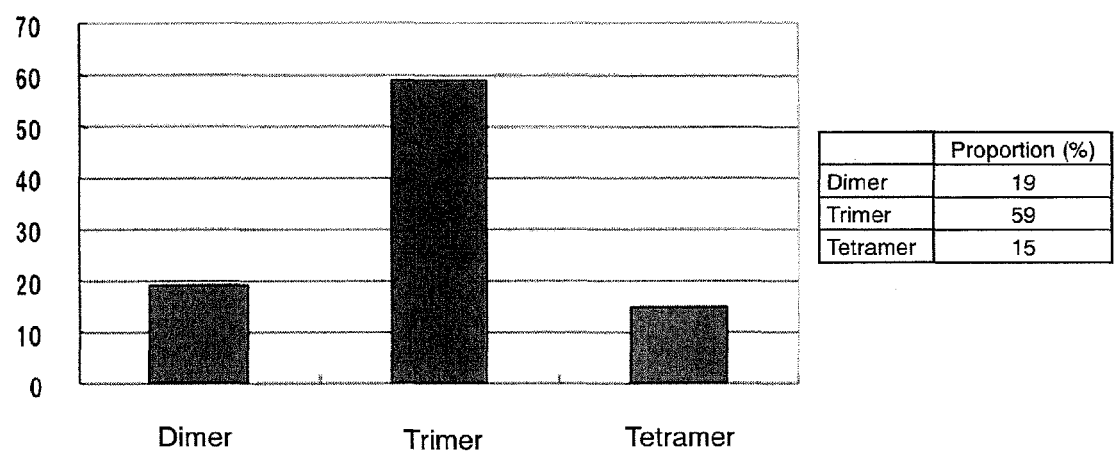
FIG. 2 shows the analysis results of the trimer fraction added.

Each of the monomer, dimer, trimer, and tetramer and higher oligomer fractions obtained by the above-mentioned preparation procedure was added to a beer-flavored beverage so as to give a concentration of 0.01 g/100 mL, and the resulting beverage was subjected to sensory evaluation. The analysis result for the trimer fraction added is shown in FIG. 2.

The sensory evaluation results are shown in Table 1. The evaluation was conducted by four panelists, who rated the fractions for the evaluation items in increments of 0.5 points using the following criteria: 0 point, "do not feel" and 3 points, "strongly feel" (the ratings shown in the table each represent an average of those given by the four panelists). The evaluation items consisted of the positive elements, i.e., koku (profoundness) and robustness, and the negative elements, i.e., lingering aftertaste and astringency.

TABLE 1

|  | Koku | Robustness | Lingering aftertaste | Astringency |
| --- | --- | --- | --- | --- |
| Control | 1.2 | 1.2 | 0.3 | 0.3 |
| Monomer | 0.9 | 1.3 | 0.9 | 1.4 |
| Dimer | 1.1 | 1.3 | 0.6 | 0.9 |
| Trimer | 2.0 | 1.9 | 0.3 | 0.1 |
| Tetramer | 1.8 | 1.6 | 0.8 | 0.5 |

The results revealed that the beverages to which the monomer and dimer fractions were respectively added showed an increase in koku and robustness while giving some feeling of lingering aftertaste and astringency. On the other hand, it was found that the beverages to which the trimer and tetramer fractions were respectively added showed a significant increase in koku and robustness but showed little increase in the negative elements. Among the latter beverages, the one to which the trimer fraction was added yielded the best result—it showed no increase in even the negative lingering aftertaste, and only showed an increase in the positive elements.

Example 4

Analysis of Proanthocyanidins with Various Degrees of Polymerization Contained in Beverages Five hundred liters each of commercially available products such as beers and low-malt beers were sonicated, deaerated, and then concentrated to 250 mL at 30° C. under reduced pressure, and the concentrates were freeze-dried. Each of the freeze-dried powders was dissolved in 20 mL of 10% ethanol, and the solution was passed through a column charged with 450 mL of Sephadex LH-20; thereafter, 1,500 mL of water, 1,500 mL of 30% ethanol, 1,500 mL of 100% ethanol, and 1,000 mL of 80% acetone were sequentially passed through the column, whereby fractions containing polyphenols and other components adsorbing to the resin were separated.

The respective fractions were concentrated to about 20 mL at 30° C. under reduced pressure, and the concentrates were freeze-dried.

The fractions eluted with 30% ethanol and subsequent eluents were dissolved again in 10% ethanol (at a concentration of 0.1 g/mL), and the solution was passed through a column charged with 60 mL of Sephadex LH-20; thereafter, 180 mL of water, 180 mL of 35% ethanol, 240 mL of 70% ethanol, 200 mL of 100% ethanol, and 100 mL of 80% acetone were passed through the column to obtain different fractions. The respective fractions were concentrated at 30° C. under reduced pressure and then the concentrates were freeze-dried and analyzed by HPLC under the same conditions. The results are shown in Table 2 (the proanthocyanidin contents are tabulated for various degrees of polymerization (in mg/L)).

TABLE 2

|  | Product A | Product B | Product C | Product D | Product E |
| --- | --- | --- | --- | --- | --- |
| Monomer | 19.76 | 15.00 | 11.10 | 16.14 | 13.12 |
| Dimer | 22.66 | 19.02 | 13.30 | 20.72 | 17.52 |
| Monomer + Dimer | 42.42 | 34.02 | 24.40 | 36.86 | 30.64 |
| Trimer | 5.62 | 2.40 | 4.26 | 2.82 | 4.24 |

It was demonstrated that commercially available beers and low-malt beers have a low content of trimeric proanthocyanidin and relatively high contents of monomeric and dimeric proanthocyanidins.

Example 5

Testing of the Addition of a Trimer Fraction to a Sample Having a Low Proanthocyanidin Content Varied concentrations of the trimer fraction obtained in Example 2 were separately added to a low-malt beer test-brewed with 33% malt (sample having a low proanthocyanidin content), and the resulting samples were subjected to sensory evaluation. In this process, the low-malt beer was brewed using a hop extract (free of hop polyphenols) and analyzed for the contents of proanthocyanidins. The results are shown in Table 3 (in mg/L).

TABLE 3

|  | Test-brewed low-malt beer |
| --- | --- |
| Monomer | 2.08 |
| Dimer | 2.94 |
| Trimer | 0.15 |

Various trimer fractions were separately added to the test-brewed low-malt beer, and the resulting samples were subjected to sensory evaluation.

Table 4 shows the results of calculating the proanthocyanidin contents in the samples with different fractions added (in mg/L).

TABLE 4

|  | 1 | 2 | 3 |
| --- | --- | --- | --- |
| Proanthocyanidins in sample | 8.47 | 11.77 | 15.07 |
| Monomer | 2.08 | 2.08 | 2.08 |
| Dimer | 3.64 | 4.24 | 4.94 |
| Trimer | 2.25 | 4.35 | 6.45 |
| Tetramer | 0.5 | 1.1 | 1.6 |
| Pentamer and higher oligomers | Below limit of detection | | |

Sample No. 1 contained trimeric proanthocyanidin in an amount of 2.25 mg/L and, according to the sensory test results, gave some feeling of increased koku as compared with the untreated test-brewed low-malt beer noted above.

Sample No. 2 contained trimeric proanthocyanidin in an amount of 4.35 mg/L, and, according to the sensory test results, showed a marked increase in koku and gave some feeling of robustness as compared with the untreated test-brewed low-malt beer noted above.

Sample No. 3 contained trimeric proanthocyanidin in an amount of 6.45 mg/L and, according to the sensory test results, gave some feeling of koku and robustness as compared with the untreated test-brewed low-malt beer noted above.

As shown above, it was found that koku and robustness are increased with an increase in the trimeric proanthocyanidin content or in the relative proportion of this content.

Example 6

Testing of the Addition of a Trimer Fraction to an Alcohol-Free Beer-Flavored Beverage A trimer fraction was prepared from hop pellets using the same procedure as in Examples 1 and 2. Table 5 shows the analysis results of the prepared trimer fraction, which contained trimeric proanthocyanidin in a concentration of 61.0% by weight.

TABLE 5

|  | Relative content (% by weight) |
| --- | --- |
| Dimer | 15.2 |
| Trimer | 61.0 |
| Tetramer | 21.2 |

The obtained trimer fraction was added to each sample of a commercially available alcohol-free beer-flavored beverage so as to give a trimeric proanthocyanidin concentration of 2.1 ppm (T1), 4.2 ppm (T2), or 6.3 ppm (T3). The trimeric proanthocyanidin contents in the commercial alcohol-free beer-flavored beverage samples were analyzed by the procedure described in Example 4. The commercial alcohol-free beer-flavored beverage samples with different amounts of the trimer fraction added were subjected to sensory evaluation. The sensory evaluation was conducted by four panelists, who rated the samples for the evaluation items in increments of 0.5 point using the following criteria: 0 point: "do not feel" and 3 points: "strongly feel" (the ratings shown in the table given below each represent an average of those given by the four panelists). The evaluation items consisted of the positive elements, i.e., koku (profoundness) and robustness, and the negative elements, i.e., lingering aftertaste and astringency.

Table 6 shows the analysis results for the contents of monomeric to trimeric proanthocyanidins in the alcohol-free beer-flavored beverage with no trimer fraction added. Table 7 shows the analysis results for the contents of monomeric to pentameric proanthocyanidins in the alcohol-free beer-flavored beverage samples with different amounts of the trimer fraction added. Table 8 shows the sensory test results.

TABLE 6

|  | Content (mg/L) |
| --- | --- |
| Monomer | 0.35 |
| Dimer | 1.34 |
| Trimer | 0.74 |

TABLE 7

|  | Content (mg/L) | | |
| --- | --- | --- | --- |
|  | T1 | T2 | T3 |
| Proanthocyanidins in sample | 5.42 | 8.76 | 12.10 |
| Monomer | 0.00 | 0.00 | 0.00 |
| Dimer | 1.86 | 2.38 | 2.90 |
| Trimer | 2.84 | 4.94 | 7.04 |
| Tetramer | 0.72 | 1.44 | 2.16 |
| Pentamer | Below limit of detection | | |

TABLE 8

|  | No addition | T1 2.1 ppm addition | T2 4.2 ppm addition | T3 6.3 ppm addition |
| --- | --- | --- | --- | --- |
| Koku | 0.9 | 1.6 | 1.6 | 1.6 |
| Robustness | 0.9 | 1.4 | 1.6 | 1.6 |
| Bitterness | 1.3 | 1.4 | 1.3 | 1.6 |
| Lingering aftertaste | 0.4 | 0.6 | 0.7 | 0.6 |
| Astringency | 0.3 | 0.4 | 0.6 | 0.4 |

It was found that, as compared with the case of no addition, all the 2.1 ppm (T1), 4.2 ppm (T2), and 6.3 ppm (T3) additions imparted taste elements such as koku and robustness to the beverages without significantly increasing astringency or lingering aftertaste.

As shown above, koku and robustness can be imparted even to alcohol-free beer-flavored beverages, but the beer-flavored beverages used in this Example, to which the fraction was added in smaller amounts than it was added to alcohol-containing beer-flavored beverages, could display the same effects as those of the latter beverages. The mechanism by which the alcohol-free beer-flavored beverages could display the same effects with less fraction added is unknown, but no alcohol content is presumably a factor. However, this presumption does not limit the present invention.

INDUSTRIAL APPLICABILITY

The present invention can, without increasing astringency or lingering aftertaste, impart koku and robustness to low-malt beers which are generally inferior to beers in koku and robustness, beer-flavored beverages which are classified as liqueurs in Japan, and low-alcohol or completely alcohol-free beverages. This invention can also provide beverages that are rich in trimeric proanthocyanidin and thus have koku and robustness.

The invention claimed is:

1. A hop extract comprising dimeric, trimeric and tetrameric proanthocyanidins, wherein the trimeric proanthocyanidin is contained in a proportion by weight of at least 1.2 times the sum of weights of the dimeric and tetrameric proanthocyanidins.

2. The hop extract according to claim 1, comprising the trimeric proanthocyanidin in a concentration of at least 20% by weight.

3. A tasting agent comprising hop-derived trimeric proanthocyanidin, comprising the trimeric proanthocyanidin in a proportion by weight of at least 1.2 times the sum of weights of dimeric and tetrameric proanthocyanidins.

4. The tasting agent according to claim 3, comprising the trimeric proanthocyanidin in a concentration of at least 20% by weight.

5. A beverage comprising monomeric, trimeric and dimeric proanthocyanidins, wherein the trimeric proanthocyanidins content is 0.2-7.4 mg/L, and wherein the sum of the monomeric and dimeric proanthocyanidin contents is 1.0-11.0 mg/L.

6. The beverage according to claim 5, wherein the beverage is a beer-flavored beverage.

7. A method for preparing a hop extract comprising trimeric proanthocyanidin, the method comprising the steps of:
 (i) extracting polyphenols from a hop using water;
 (ii) passing the resulting extract through a gel filtration column;
 (iii) passing aqueous alcohol solutions through the column at sequentially increasing concentrations between 0% and 100%, so that trimeric proanthocyanidin is eluted from the column; and
 (iv) recovering the eluted trimeric proanthocyanidin fraction,
 (v) preparing a hop extract comprising the trimeric proanthocyanidin in a proportion by weight of at least 1.2 times the sum of weights of dimeric and tetrameric proanthocyanidins.

8. The method according to claim 7, wherein the alcohol is ethanol.

* * * * *